June 6, 1961 B. E. PORTER 2,987,085
AUTOMATIC SEQUENCING WOOD SAW AND CLAMP
Filed Aug. 1, 1958 6 Sheets-Sheet 4
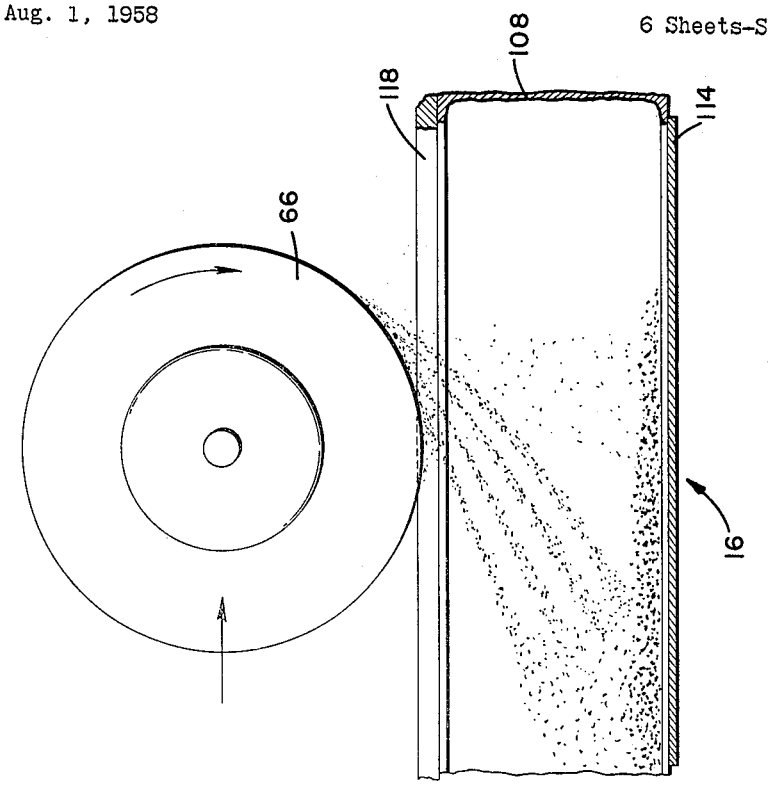
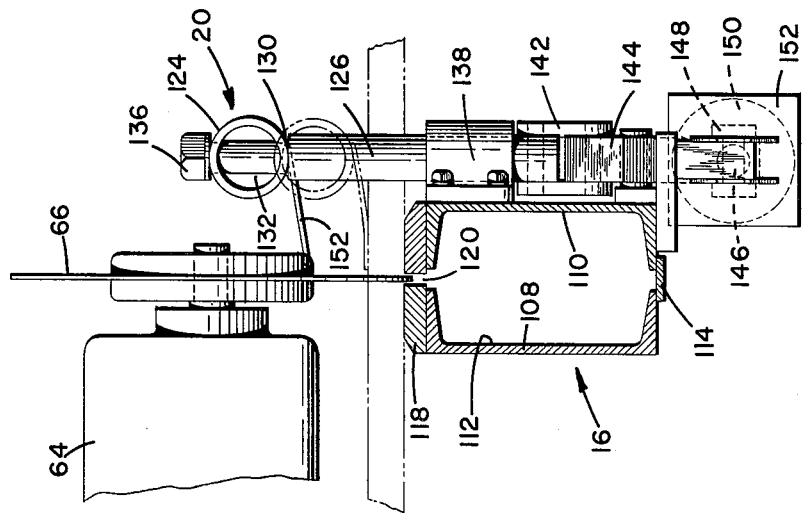
INVENTOR.
BURKE E. PORTER
BY
ATTORNEYS

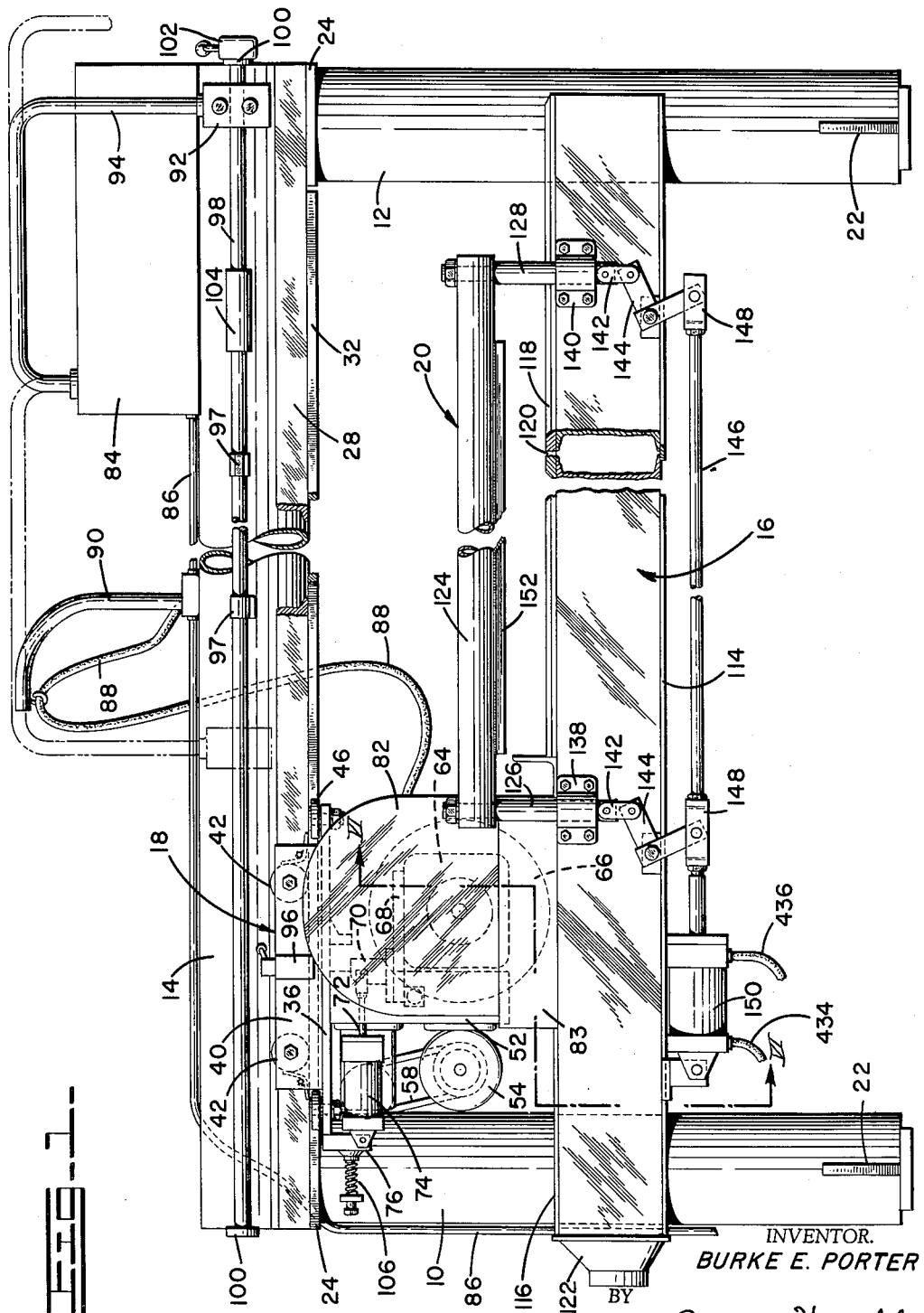

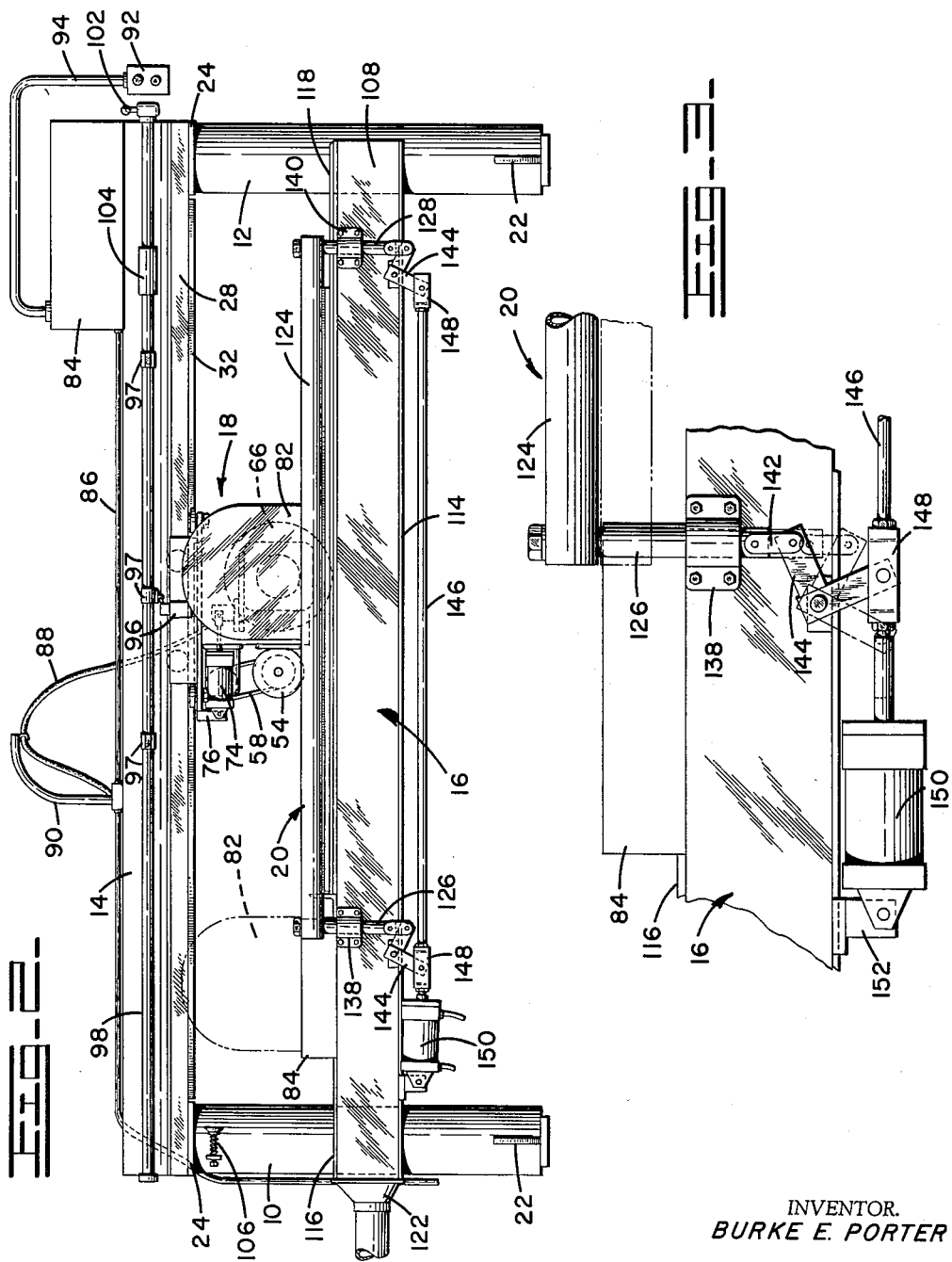

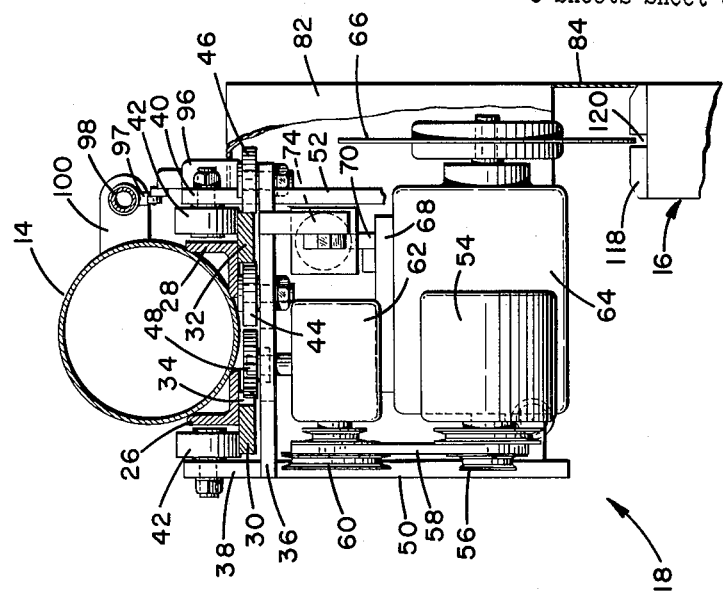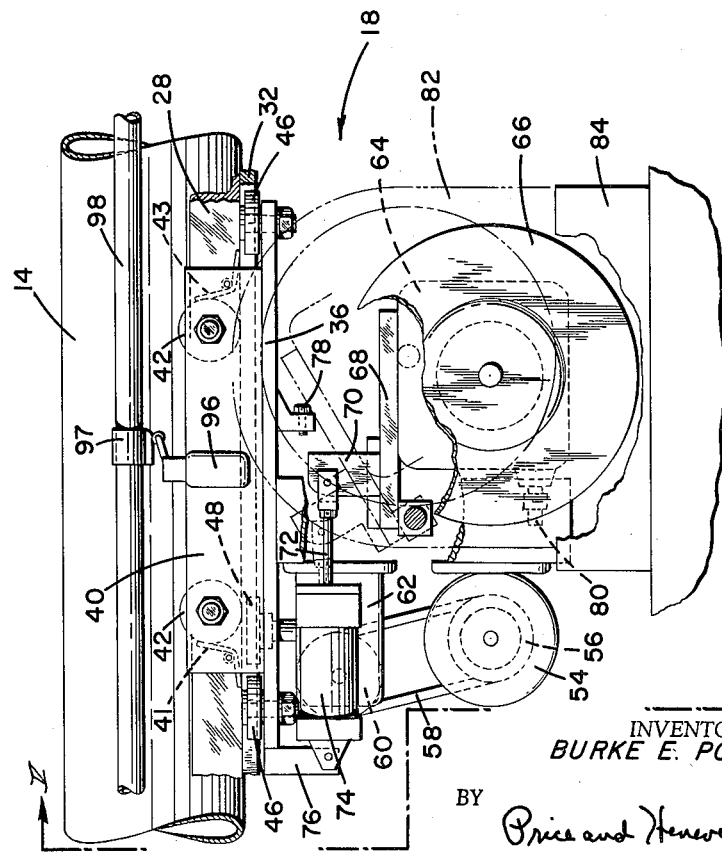

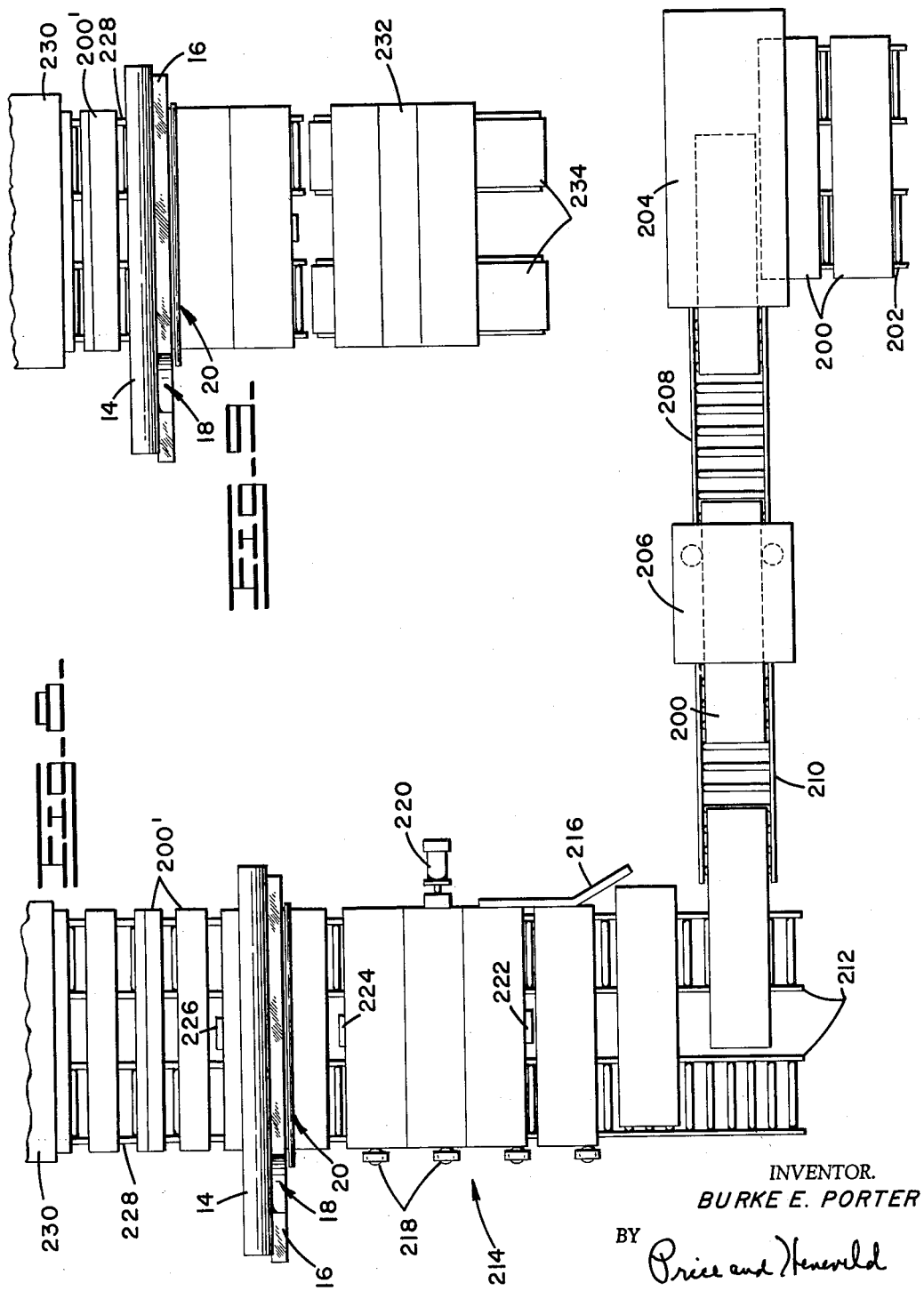

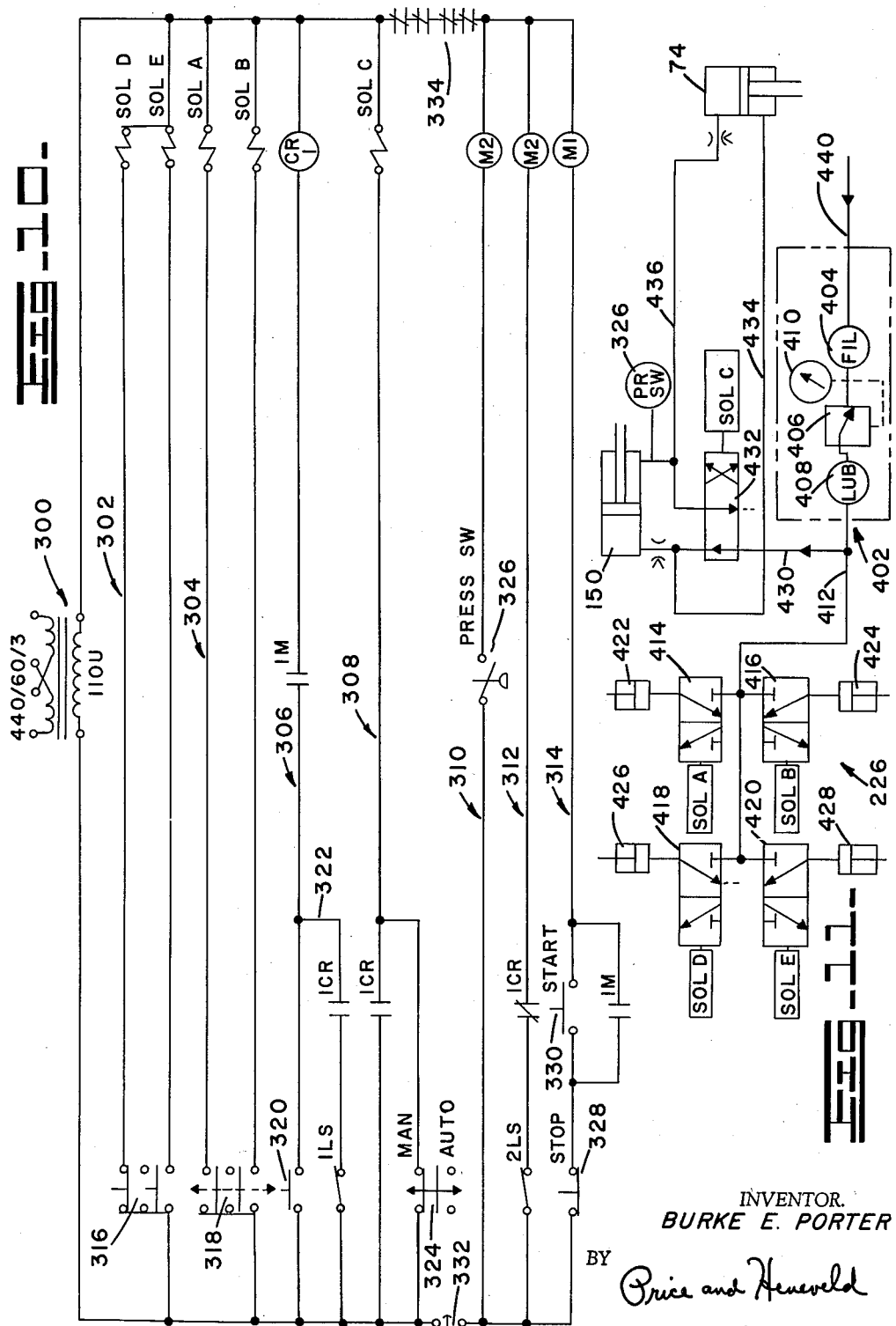

United States Patent Office 2,987,085
Patented June 6, 1961

2,987,085
AUTOMATIC SEQUENCING WOOD SAW
AND CLAMP
Burke E. Porter, East Grand Rapids, Mich., assignor to
Burke E. Porter Machinery Company, Grand Rapids,
Mich., a corporation of Michigan
Filed Aug. 1, 1958, Ser. No. 752,631
6 Claims. (Cl. 143—47)

This invention relates to power saws in general and more particularly to a power operated travel saw and work clamping mechanism highly adaptable for commercial use.

Power operated saws are commonly known for production uses. One of the more commonly known production saws is the straight line saw. This saw includes either manual or power means for moving the power operated saw across the work to be cut. Unfortunately, this saw has several serious disadvantages which have limited its use to short run operations on small work pieces.

The straight line saw, as presently known, is required to make a full work and return stroke. The return stroke is obviously lost production time and since the longer the stroke required to be made the longer the return stroke, only relatively small work pieces are cut with this saw. Furthermore, the retracing of a saw cut during a return stroke may cause damage to the edge of the work piece unless the operator is very careful. This may cause the return stroke to take even longer than the work stroke. Another factor is that the saw blade is unnecessarily dulled during a return stroke by a work piece having any abrasive character.

This invention discloses a new and vastly improved power operated travel saw having none of the disadvantages just mentioned. The power operated saw of this invention includes a power operated carriage and means for disposing the saw blade in cutting and retracted positions. The saw blade is required to be engaged with the work only during its work stroke. Further, the work stroke may be preselected so that no excess travel is necessary. A fast carriage return is provided when the saw blade is retracted. A power operated work clamp is incorporated into the system and is synchronized with the sawing operation. Accordingly, larger boards and panels may be cut than heretofore was practical, without the incident lost time, with improved quality of the cut, and with less wear of the saw blade. Furthermore, the use of an improved saw of the character hereinafter disclosed, enables a system of operation which has not been possible before. The power saw and intercooperative clamp of this invention enables the automated work system of cutting work pieces from panels made up from smaller boards with an incident saving of more work pieces for a given quantity of lumber.

Accordingly:

It is an object of this invention to disclose a power operated and power controlled saw for commercial use.

It is also an object of this invention to disclose a power operated work clamp for use with the power operated and controlled saw, and which is cooperatively interconnected therewith.

Another object of this invention is to disclose a power operated and controlled saw having a direct drive for the saw supporting carriage and a compact carriage drive and guide support arrangement therefor.

Still another object of this invention is to disclose a power operated and controlled saw having a selectively adjustable work stroke and including means assuring a fast return of the saw upon completion of such work stroke.

A further object of this invention is to disclose a fully automatic power operated and controlled saw including movement into a work engaging position, a predesignated work stroke, retraction of the saw from its work engaging position, and a fast return stroke.

A still further object of this invention is to disclose an operatively interconnected work saw and clamping mechanism, whereby the actuation of said saw is dependent upon the prior setting of the work clamp. And further, the retraction of the saw from a work engaging position, at the end of its work stroke, or otherwise, will cause the clamp to be released.

An even further object of this invention is to disclose a cooperative arrangement of exhaust means for the work dust with the power operated and controlled saw and work clamp.

Among the objects of this invention is to disclose a work system for utilizing the advantages of this work saw and clamp mechanism. This includes having the work material formed in panel sizes and automatically conveyed to the disclosed machine. It also includes having the parts cut with the disclosed machine and automatically conveyed to such as a magazine loader for a molding machine.

Also among the objects of this invention is to disclose a work system for utilizing what might otherwise be considered scrap material. This system includes the utilization of materials of reasonable size and which are generally salvageable, forming such materials into sizable panels of random width and length, and automatically feeding and ripping said panels to selected widths.

These and other objects and advantages in the practice of this invention will be more apparent in the illustration and description of a working embodiment of the invention, as hereinafter set forth.

In the drawings:

FIG. 1 is a front elevation view of the power saw and clamp device, showing the power saw in a lowered and retracted position.

FIG. 2 is a reduced front elevation view of the power saw and clamp device, showing the saw in an advanced position.

FIG. 3 is an enlarged front elevation view of the actuating mechanism of the work clamp.

FIG. 4 is an enlarged front elevation view of the power saw and shows the raised and lowered positions of the saw blade and saw carriage.

FIG. 5 is an end view of the power saw and a cross sectional view of the saw carriage and its overhead support as seen in the plane of line V—V of FIG. 4.

FIG. 6 is an enlarged cross sectional view of the power saw and work clamp taken in the plane of line VI—VI of FIG. 1 and looking in the direction of the arrows thereon.

FIG. 7 is an enlarged front view of the saw blade and a cutaway of the work support showing the means by which the work dust is carried away.

FIG. 8 is a schematic illustration of the work system with which the power operated work saw and clamp device is used.

FIG. 9 is a schematic illustration of a modification of the proposed work system with which the device of this invention may be used.

FIG. 10 is an electrical wiring diagram of the work saw and clamp device.

FIG. 11 is a flow diagram of the pneumatic system of the work saw and clamp device.

The power saw of this invention is shown by the drawings to include upright standards 10 and 12 having a horizontal tubular support 14 disposed therebetween. An additional cross support member 16 is secured to the standards 10 and 12 in parallel spaced relation to the overhead support 14. A power driven saw carriage 18 is mounted on the overhead support 14 and a clamp mechanism 20 is mounted on the intermediate support 16.

The power driven saw carriage 18 is adapted to traverse the length of the overhead support 14, within the limits provided, and to return. The clamp mechanism 20 is adapted to hold the material to be cut on the cross support 16 while the power saw of the carriage performs its function.

The framework of the disclosed power saw includes the tubular column supports 10 and 12 and the horizontal support 14. Standard supports 22 and mounting pads 24 are provided on the uprights 10 and 12. Angle iron reinforcing members 26 and 28 are secured to the sides of the horizontal member 14 to provide a plane surfaced underside; is best shown in FIG. 5. Lengths of bar or strap iron stock 30 and 32 are secured to the angle iron members 26 and 28 and extend outwardly thereof to form a ledge or shoulder to receive and support the saw carriage 18. The one member 30 is formed to include a rack surface 34 on its inner edge.

The saw carriage member 18 is adapted to be supported by the horizontal beam 14. The carriage hangs beneath the cross beam and is supported on the overhanging provided by members 30 and 32. The carriage 18 includes a plate member 36 longer than it is wide, and of a width sufficient to extend beyond the sides of the over-hanging shoulders 30 and 32. Upright flanges 38 and 40 are provided on the side edges of the carriage plate 36. Roller wheels 42 are mounted on the flanges 38 and 40 and are disposed to ride on the overhanging shoulders 30 and 32 of the support beam 14. Accordingly, the carriage 18 is mobile lengthwise of the support beam with a minimum of frictional resistance. Wiper elements 41 and 43 (FIG. 4) are provided to keep the wheels and guiding shoulders clean.

The carriage is prevented from lateral movement by pairs of guide wheels 44 and 46 that are mounted on the carriage plate 36 and are engaged on opposite side edges of the shoulder member 32. A drive pinion 48 is also mounted on the carriage plate 36 and is diposed in meshing engagement with the rack bar surface 34 of the other shoulder member 30.

A pair of depending arms 50 and 52 are provided on the carriage plate 36. These arms serve to support the power mechanism of carriage 18. A drive motor 54 is mounted on the arm members near their lower end. The drive motor includes a drive pulley 56 which is connected by belt means 58 to the driven pulley 60 of an angle drive unit 62. The angle drive unit 62 is mounted on the depending carriage arms 50 and 52 just under the carriage plate 36. The angle drive unit 62 operates the pinion gear 48 which, in turn, meshes with the rack 34.

A separate drive motor 64 is mounted between the carriage arms 50 and 52. The motor 64 drives the saw blade 66. The motor 64 is secured to a plate 68 which is pivoted about a shaft near one end thereof. A bracket 70 is secured to the mounting plate 68 and it is engaged by the piston rod 72 of a power cylinder 74. The power cylinder 74 is pivotally mounted on a bracket member 76 hanging down from the carriage plate 36. The power cylinder is adapted to move the saw blade drive motor 64 between the full and dotted line positions shown by FIG. 4. An adjustable stop 78 limits the retracted movement of the saw motor and an adjustable cushion stop 80 defines its lower position.

The saw blade 66 is enclosed in a shroud 82 which permits due movement of the blade between its raised and lowered positions. When the blade is retracted it is received totally within the shroud 82. When the blade is lowered for use it projects beyond the lower limit of the shroud cover. A shielding cover 83 (FIG. 1) is mounted on the cross bar 16 and is in position to receive the shroud cover 82 thereover when the saw carriage is in its retracted position.

The drive motors 54 and 64 are connected to a control box 84 mounted on the cross beam 14. The control box 84 is connected to a power source via the thin wall conduit 86. The feed line 88 from the control box to the drive motors of the carriage 18 also makes use of this conduit. A swing arm 90 is used to keep the feed line 88 out of the way during the linear travel of the power saw.

A control 92 for the operation of the saw is connected to the control box 84 by means of a swing arm 94. This arm permits the control to be located on either side of the power saw structure. The swing arm is connected to the inner end of the control box and is adapted to swing around its outer end. Accordingly, the control is quite readily accessible at all times.

The saw mechanism, once started, operates automatically as will later be described. The saw carriage 18 includes a limit stop switch 96 which has an operating arm disposed for engagement with certain switch actuating means. Such means includes stop lugs 97 mounted on a rotatable bar 98 which extends the length of the horizontal support beam 14. The bar is mounted on brackets 100 and includes a handle 102. The bar 98 can be rotated to selectively position one of the stop lugs 97 to actuate the limit switch 96 as it passes thereunder. In this way the saw mechanism is not required to make a full pass between the standards 10 and 12, unless desired. A stop collar 104 is mounted on the control bar 98 to provide a positive end travel limit. All of the stops are adjustable on the bar 98 as by set screws or other means (not shown).

A spring or pneumatic bumper 106 is provided on the standard 10 and is disposed for engagement with the end of the carriage 18 to limit the return travel. One of the stop lugs 97 may be disposed to cut off the carriage drive motor 54 so that the carriage merely coasts in on the bumper stop 106.

The horizontal cross support 16 is disposed just under the saw carriage 18. As shown best by FIG. 6, this support is made from a pair of channel beams 108 and 110 having their open faces adjacently disposed to provide a tubular passage 112. The channel beams are secured together by a closure plate 114 at their bottom and by tie members 116 (FIG. 1) and 118 at their upper surface. One of these members, 118, includes a gap 120 to receive the saw blade 66 therein. Accordingly, in cutting material received on the support 14 the sawdust is delivered into the passageway 112 which is formed by the channel beams. A suction fan or blower is connected to the outlet end 122 of the sawdust passageway.

The clamp mechanism 20 is mounted on the side of the cross support 16. The clamp mechanism includes a tubular member 124 supported on upright posts 126 and 128. As shown by FIG. 6, each post includes a shoulder 130 and narrow neck 132. The tubular member 124 rests on the shoulders 130 and receives the necks of the posts therethrough. Lock nuts 136 are threaded on the ends of the posts.

The posts 126 and 128 are slidable within brackets 138 and 140 mounted on the side of the support 16. The tubular member 124 is vertically reciprocal by means of operating links 142 and 144 connected to a draw bar 146 (see FIGS. 1 and 2). The link 144 is in the form of a bell crank and is pivotally mounted at its apex to the cross support 16. The ends of the links 144 are connected to the posts 126 and 128 through links 142, and to coupling members 148 on the draw bar.

A power cylinder 150 is pivotally mounted on the cross support 16 by means of a hanging bracket and is operatively engaged to the draw bar 146. Reciprocal movement of the draw bar 146 causes vertical reciprocal movement of the posts 126 and 128.

The tubular member 124 includes a spring plate 152, extending substantially the length thereof between posts 126 and 128; reference FIG. 6. The spring plate member 152 serves to engage and hold a wood panel or the like, to be cut by the saw, in firm and secure engagement with the cross brace 16. As shown in dot-dash lines in FIG. 6 the spring plate 152 may be slightly compressed in the course of its clamping operation.

Work flow

The power operated travel saw and clamp mechanism just described readily forms a part of, and makes possible, a system of obtaining maximum use out of a given amount of board feet of lumber or panel sheets. This system is best described with reference to FIGS. 8 and 9.

In ripping large pieces of lumber, to make moldings or the like, there is usually considerable scrap loss in each piece of lumber. This is particularly true, and exists at both sides of the larger piece of lumber, where the parts being cut have some curvature.

It is here proposed to receive and process a group of larger pieces of lumber, to secure them together into sizable random panels, and to then automatically rip off smaller pieces to selected widths, progressively one after the other. This may be a fully automated process in which power operated conveyor means transfer the lumber from one operating station to another or may be a semi-automated operation having larger panels received at the saw and clamp and the smaller parts automatically carried away, as to a magazine loader for a molding machine.

Referring to FIG. 8, generally uniform widths of lumber 200 are processed to remove knots, splits, wanes, etc. They are received from a conveyor 202 at a planer 204. The boards are passed from the planer 204 to a jointer 206 by means of another conveyor 208. From the jointer 206 the dressed and edged boards 200 are moved via a conveyor 210 to a conveyor 212.

In the present instance the conveyor table 212 is shown to include a glue table station 214. A guide 216 directs the boards 200 into alignment for receipt at the glue station 214. Roller means 218, of one form or another, are positioned to receive one end edge of the boards while a power operated clamp 220 engages and orients the other end edges thereof. Glue clamps 222 and 224 are provided at the glue station 214 and may be operatively connected to the conveyor 212 so that the clamping operation for gluing purposes can be performed during the travel of the boards 200 towards the power saw and clamp mechanism.

The panel formed by a group of the boards 200 is fed to the power saw immediately after it is formed and set. Some means of accumulating the panels may be required to provide time for the gluing operation and the difference in the consumption rate of the saw as compared to the feed rate of the rest of the system. However, this is considered sufficiently obvious to require no illustration.

The panels received at the power saw are fed through the saw clamp to engage a selected length stop 226. They are then clamped and held by the power operated clamp mechanism 20 while the saw carriage 18 travels across the support 14 and returns. The specific operation of the saw and clamp will be subsequently discussed in detail.

The smaller pieces or parts 200', which have been cut from the panels formed by boards 200, are next transferred by conveyor means 228 to a magazine loader 230 such as is used to feed a molding machine (not shown). The smaller parts 200' might also be fed by the conveyor means 228 to some other work station.

FIG. 9 shows a semi-automated system in which a panel 232 is received from a loader 234. The panel 232 is shown to comprise boards of random widths to show that this system may also make use of different widths of lumber and foreseeably even what might normally be considered scrap (provided it is of sufficient width to warrant the preceding steps of planing, jointing, etc.).

The panel 232 is received on a conveyor means 236 which feeds the power saw and clamp mechanism. The operation and take-off is the same as previously described.

It should be appreciated, at this point, that the system proposed offers a great savings both as regards obtaining the maximum use of a given quantity of lumber and also as regards eliminating the problems of scrap disposal and salvage. By the use of an automatically controlled power operated travel saw and an intercooperative clamp mechanism large panels may be made up from given board widths and may be fed into the saw and clamp mechanism to make full use of the board footage of the panel. The jointed edges of different boards in the panel will form a fast bond that is as strong as the board itself and will provide one or more extra pieces out of a given quantity of lumber which would otherwise be non-salvageable scrap.

The particular saw disclosed makes a straight cut. However, other forms of saws for irregular or arcuate cuts could be used in this system to equal or even greater advantage.

Control system

The electrical control system (FIG. 10) includes a power source 300 comprising a step down transformer having a 440 v., 60 cycle, 3 phase primary and a 110 v., 2 phase, secondary. Several control circuits including the length stop circuits 302 and 304, the operating circuit 306, the clamp and head control circuit 308, the forward and reverse saw travel circuits 310 and 312, and the saw operating circuit 314 are connected in parallel with each other across the power supply.

The length stop circuit 302 includes solenoids D and E selectively activated by a control switch 316. The length stop circuit 304 includes solenoids A and B that are selectively activated by a control switch 318.

The operating circuit 306 includes a relay coil CR1 in series with a momentary motor operating button control 320. A holding shunt 322 includes a limit switch 1LS and a normally open relay switch 1CR provided across the start button 320. A normally open relay switch 1M is in series between the start button control 320 and the relay coil CR1. When the contact switch 1M is closed, and the start button 320 is depressed, the coil CR1 is energized to close the switch 1CR and maintain the circuit closed.

The activation of the coil CR1 also closes the normally open contact switch 1CR of the clamp and head control circuit 308. This relay switch is in series with solenoid C which operates the control cylinder 150 of the clamp mechanism and the saw support plate 68. An auto-manual control circuit breaker 324 is shunted across the relay switch 1CR to afford automatic or manual energization of solenoid C and thus control for the clamping sw head operation by means of cylinders 150 and 74.

The forward saw carriage drive circuit 310 includes the forward drive winding M2 of the carriage drive motor 54 in series with a pressure switch 326. This switch is closed when the clamp is activated and the saw is in a cutting position. The reverse drive circuit 312 includes the reverse drive winding M2 of the carriage drive motor 54 in series with a limit switch 2LS and a normally closed contact relay 1CR.

The saw operating circuit 314 includes the winding M1 for the saw motor 64 in series with separate stop and start controls 328 and 330. A contact switch 1M is shunted across the start control 330.

Between the clamp circuit 308 and the motor control circuits 308, 312 and 314 there is provided an emergency stop control 332 and circuit breakers 334.

The control system operates as follows:

The operator first selects one of the length stops controlled by solenoids D, E, A and B. This determines how much will be cut from a panel. This selection may be changed at any time by changing the control setting of switches 316 and 318.

The motors of the power saw are started by pressing the start control 330. This energizes the saw motor winding M1 and closes the contact switch 1M to hold the saw motor in operation. The relay switch 1M in the operating circuit 306 is also closed.

When the momentary run button 320 is depressed the CR1 coil is energized and the relay switches 1CR are closed in circuits 306 and 308. This serves to keep the coil CR1 energized and to activate the solenoid C which operated the power clamp 20 and the saw head. The 1CR contact switch, in the reverse carriage travel circuit 312, is open so that the reverse winding of the carriage drive motor is inactive.

When the pressure switch 326 is activated, indicating the clamp and saw head are down, then the saw carriage 18 starts its forward motion. At the end of its selected stroke, as determined by the positioning of the stop lugs 97 on the control rod 98, the limit switch 1LS (96 in the mechanical drawings) is thrown open in the operating circuit 306. This breaks the holding shunt 322 and cuts off power to the coil CR1. When the coil CR1 is de-energized the relay switches 1CR in circuits 306 and 308 are opened. The opening of the contact switch 1CR in circuit 308 de-energizes solenoid C to release the clamp 20 and activate the power cylinder 74 to raise the saw motor 64 and blade 66. The normally closed relay switch 1CR in circuit 321 is also closed when the coil CR1 is de-energized. The closing of the contact switch 1CR cuts in the reverse feed winding M2 of the carriage drive motor 54 to effect a rapid return of the saw carriage 18 with the saw in its raised position. The forward feed winding is cut out when the pressure is released from the work clamp and the pressure switch opens.

The saw carriage, on its return, is ready for another stroke and requires only that the run control 320 be pushed to repeat the cycle.

*Pneumatic control system*

The pneumatic control system is shown by FIG. 11. An air pressure source is connected at 440 to a unit 402, shown in phantom outline, which includes an air filter 404, regulator 406, and lubricator 408. A pressure gauge 410 is connected to the regulator 406 for visual inspection of existing pressure.

The line pressure is conveyed through a line 412 to solenoid operated valves 414, 416, 418 and 420 interposed between the pressure line 412 and power cylinders 422, 424, 426, and 428. The valves are operated by solenoids A, B, D and E respectively. The solenoid, valve and cylinder of each unit forms a length stop assembly such as 226 in FIG. 8. As previously discussed, these stops are positioned on the output side of the saw and clamp device to selectively limit the length of a panel received through the saw clamp 20. They are thus also determinative of the width of the member to be ripped from the panel.

An air line 430 interconnects with line 412 to provide pressure to a four-way valve 432 which is operated by solenoid C. Power cylinders 74 and 150 are connected to the valve 432 in a manner whereby when the piston of one of them is advanced the other is retracted and vice versa. When the cylinder 150 is activated to lower the clamping mechanism 20, the power cylinder 74 is bled to let down the saw supporting plate 68. When the cylinder 74 is set to perform its work stroke, to raise the saw supporting plate 68, then the cylinder 150 is inactivated and the clamp mechanism is released. The interconnecting jumper lines are designated 434 and 436.

A pressure switch 326 is in the line 436 and is part of the electrical circuit 310. This switch is closed when the clamp actuating cylinder 150 is activated and the saw head controlling cylinder 74 has lowered the saw head. When the valve 432 is set to cause the cylinder 150 to release the saw clamp and the cylinder 74 to retract the saw head, then the switch is open. Accordingly, pressure switch 326 provides an operative interconnection between the electrical control system and the pneumatic control system to assure against travel of the saw carriage 18 until the clamp 20 is set.

*Operation*

The disclosed power operated travel saw and clamping device is used to best advantage in a work flow system such as disclosed by FIGS. 8 and 9. All operations of the saw and clamp device are initiated by an operator by means of the control 92 at the end of the pendant arm 94 connected to the control box 84. The control 92 may include the length stop switches 316 and 318, the run control 320, the manual or automatic selector 324, the start and stop saw motor controls 328 and 330, and the emergency control 332. However, all of these switches need not be at the operator's fingertips and some may be located elsewhere.

With power to the saw, the first operational step is the selection of one of the length stops 226 in accord with the width of the member to be ripped from the panels that are to be fed to the saw. This is done by means of switches 316 and 318.

The next step is to activate the saw motor 64 and start the saw blade 66 in operation. This is done by depressing the start switch 330. When the saw motor 64 is in operation coil M1 closes contact switch 1M, across the start switch, to maintain power to the saw motor. Contact switch 1M in the operating circuit 306 is also closed to ready the saw carriage 18 for travel.

With the automatic manual switch 324 set for automatic operation, all that remains is to depress the run switch 320. The interaction of the electrical relays on depressing switch 320 has been previously described. Accordingly, this description is directed principally to the operation of structural components.

The power cylinder 150 is first activated to draw the bar 146 and lower the clamp posts 126 and 128 via the locking links 144. This depresses the tubular clamping cross member 124 and forcefully engages the spring plate 152 to a panel received under the clamping mechanism and on the support 16.

At the same time, due to the interconnection of the power cylinders 150 and 74 via the air line 436, the cylinder 74 actuates rod 72 to lower the saw head; comprising the pivotal support plate 68, the saw motor 64, and cutting blade 66. The saw head is lowered to the limit set by the adjustable stop 80, shown in FIG. 4. The saw blade 66, as lowered for cutting, is within the shielding base cover 83.

As the clamping mechanism is being set the pressure build up in the pneumatic line 436 will close the pressure switch 326. This switch will in turn close circuit 310 and provide power to the forward drive winding M2 of the carriage drive motor 54.

The carriage drive motor 54 operates the angle drive unit 62 via the belt drive 58. The angle drive 62 causes pinion gear 48 to be rotated. Its meshing engagement with the rack surface 34 of the flange rail 30, on the overhead travel support 14, drives the saw carriage 18 from the retracted position shown in FIG. 1 to an end stroke position such as shown by FIG. 2.

The saw carriage 18 is supported on flanges 30 and 32 of the overhead support 14 by the wheels 42. The carriage is stabilized against lateral movement by the guide wheels 44 and 46. The operation of the carriage thus takes very little drive effort and at the same time the rack and pinion drive arrangement provides a positive drive suitable for cutting thick panels.

The length of the carriage travel on support 14 is determined by the prepositioned stop lugs 97. Thus the saw is required to travel a distance only such as completes its work stroke and need not include any non-productive travel. When the limit switch 96 is actuated by engagement with a stop lug 97, the switch 1LS in the operating circuit 306 is opened and the operating coil CR1 is without power.

As previously recited, when coil CR1 is inactivated, solenoid C reverses the air pressure supply to cylinders 74 and 150. The clamping bar 124 is raised and the piston rod 72 is retracted to lift the saw head. This opens the pressure switch 326 and inactivates the forward drive winding M2 of drive motor 74. It also closes the circuit 321 and energizes the reverse winding M2 of the carriage drive motor 54. The reverse winding is such as gives a fast carriage return. Since the saw head is raised there is no resistance to the return stroke and the carriage returns rapidly to its initial position. A bumper stop 106 may be provided to cushion the return travel. The limit switch 2LS breaks the reverse feed circuit 312 during the course of return travel and is normally positioned so that the carriage coasts in against the stop 106.

If at any time the operator wishes to effect an emergency shutdown of all operating equipment he is required only to depress the emergency stop switch 332. This de-energizes the carriage drive windings M2, forward and reverse, as well as the saw motor coil M1. The latter coil when de-energized throws the 1M relay switch in the operating circuit 306 and inactivates the coil CR1. This in turn opens the clamping and saw head circuit 308 to raise the clamp and lift the saw head.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A power actuated travel saw and work clamp, comprising; a horizontally disposed guide member, a hanging carriage member supported on said guide member, a power driven saw pivotally mounted on said carriage and operable between retracted and work engaging positions, carriage drive means mounted on said carriage and operatively engaged with said guide member, a work receiving support disposed in fixed parallel spaced relation to said guide member and in saw blade receiving relation to said saw in its work engaging position, and a power actuated work clamp mounted on said work receiving support and extending over the saw blade receiving surface thereof, said clamp including a pressure equalizing clamping member having reciprocal posts at each end thereof, a draw bar and operative linkage connected to said posts, and an operative interconnection between said carriage drive means, said power driven saw, and said work clamp for the sequential operation of said clamp into work engaging position, actuation of said saw, lowering of said saw into work engaging position, and actuation of said carriage drive means.

2. A power saw and work clamp, comprising; a horizontal overhead guide having a carriage mounted thereon for horizontal movement and disposed in hanging relation thereunder, power means for motivating said carriage on said guide, a vertically adjustable power operated saw mounted on said carriage, power means for actuating said saw and disposing said saw in at least two different vertically adjusted positions, a work support disposed in parallel spaced relation to said guide and in sawdust receiving relation to said saw in one of its adjusted positions and in the other of said saw positions being located substantially below said saw, a power actuated work clamp mounted on said work support and overhanging the work receiving surface thereof, and an operative interconnection between said power means for the sequential and automated actuation of said saw into a cutting position, of said work clamp into a work clamping position, of the advance of said saw carriage on said guide means, and the automatic reverse order actuation of said saw into a retracted position, the release of said work clamp, and the return of said carriage immediately following thereafter, the sequential motion of said saw being in the same vertical plane.

3. In combination with an overhead guided and power driven travel saw, horizontally disposed guide means along which said saw travels, power means associated with said guide means for propelling said saw on said guide means, a work receiving support and power actuated work clamp, comprising; a tubular member disposed in work supporting relation to said travel saw, said work supporting member having a saw blade receiving slot provided in its work receiving surface, a horizontally disposed bar member mounted on one side of said work support and including vertical end posts slidably engaged with said work support, power operated means for vertically actuating said end posts and said horizontally disposed bar, and a spring plate secured to said bar and extending substantially the length thereof, said spring plate having an edge thereof disposed in overhanging relation to the work receiving surface of said work support on one side of said slot, and an operative interconnection between said power means for the sequential and automated actuation of said saw into a cutting position, of said work clamp into a work clamp position, of the advance of said saw on said guide means, and the automatic reverse order actuation of said saw into a retracted position, the release of said work clamp, and the return of said saw immediately following thereafter.

4. In combination with an overhead guided and power driven travel saw, horizontally disposed guide means along which said saw travels, power means associated with said guide means for porpelling said saw on said guide means, a work receiving support and power actuated work clamp, comprising; a work receiving support disposed in aligned relation to the travel of said saw and receiving the cutting edge of the blade thereof within the work supporting surface thereof, said support including sawdust induction means, and a bar clamp mounted on said support and including a spring plate overlapping a part of the work supporting surface of said support, power actuated means operatively engaged to said bar clamp for activating said clamp and engaging said spring plate to work received on said support, and an operative interconnection between said power means for the sequential and automated actuation of said saw into a cutting position, of said work clamp into a work clamp position, of the advance of said saw on said guide means, and the automatic reverse order actuation of said saw into a retracted position, the release of said work clamp, and the return of said saw immediately following thereafter.

5. In combination with an overhead guided and power driven travel saw having a work receiving support disposed in saw blade receiving relation thereunder, horizontally disposed guide means along which said saw travels, power means associated with said guide means for propelling said saw on said guide means, a power actuated work clamp for holding work stationary on said support during the cutting stroke of said saw, and comprising; a horizontally disposed tubular member having shouldered and vertically disposed end posts secured thereto, means for journalling said end posts for vertical reciprocal movement on a side wall of said work receiving support, a power actuated and horizontally disposed draw bar mounted on the side wall of said work support, an operative interconnecting linkage between said end posts and said draw bar for simultaneously activating both of said end posts, and a spring plate secured to said tubular member and extended for engagement with the work receiving surface of said support, and an operative interconnection between said power means for the sequential and automated actuation of said saw into a cutting position, of said work clamp into a work clamp position, of the advance of said saw on said guide means, and the automatic reverse order actuation of said saw into a retracted position, the release of said work clamp, and the return of said saw immediately following thereafter.

6. A power saw and work clamp, comprising; a horizontal overhead guide having a saw mounted thereon for horizontal movement along said guide, power means for moving said saw along said guide, said saw being vertically adjustable with respect to said guide, power means for actuating said saw and disposing said saw in at least two different vertically adjusted positions, a work support disposed in parallel spaced relation to said guide and in saw-dust-receiving relation to said saw in one of its adjusted positions and in the other saw position being located substantially below said saw, a power actuated work clamp mounted on said work support and overhanging the work receiving surfaces thereof, and an operative interconnection between said power means for the sequential and automated actuation of said saw into a cutting position, of said work clamp into a work clamping position, of the advance of said saw on said guide means, and the automatic reverse order actuation of said saw into a retracted position, the release of said work clamp, and the return of said saw immediately following thereafter, the sequential motion of said saw being in the same vertical plane.

References Cited in the file of this patent

UNITED STATES PATENTS

| | | |
|---|---|---|
| 922,840 | Bemiller | May 25, 1909 |
| 1,767,012 | Pfau | June 24, 1930 |
| 1,852,387 | Wieden | Apr. 5, 1932 |
| 1,901,598 | Herzog | Mar. 14, 1933 |
| 1,934,207 | Pennock | Nov. 7, 1933 |
| 2,142,303 | Crouch | Jan. 3, 1939 |
| 2,301,028 | Esch | Nov. 3, 1942 |
| 2,368,408 | Brooking | Jan. 30, 1945 |
| 2,664,926 | Fuglie | Jan. 5, 1954 |
| 2,784,750 | Thomas | Mar. 12, 1957 |

FOREIGN PATENTS

| | | |
|---|---|---|
| 104,894 | Austria | Dec. 10, 1926 |
| 560,724 | Germany | Oct. 6, 1932 |